(12) United States Patent
Reynar

(10) Patent No.: US 7,421,645 B2
(45) Date of Patent: Sep. 2, 2008

(54) METHOD AND SYSTEM FOR PROVIDING ELECTRONIC COMMERCE ACTIONS BASED ON SEMANTICALLY LABELED STRINGS

(75) Inventor: Jeff Reynar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 09/841,266

(22) Filed: Apr. 24, 2001

(65) Prior Publication Data

US 2002/0007309 A1    Jan. 17, 2002

Related U.S. Application Data

(63) Continuation-in-part of application No. 09/588,411, filed on Jun. 6, 2000.

(51) Int. Cl.
*G06F 17/00* (2006.01)
*G06F 17/21* (2006.01)
*G06F 17/27* (2006.01)

(52) U.S. Cl. .................. 715/206; 715/230; 715/231; 715/232; 715/233; 715/234

(58) Field of Classification Search .................. 715/500, 715/512, 513, 516, 200, 206, 230, 231, 232, 715/233, 234
See application file for complete search history.

(56) References Cited

U.S. PATENT DOCUMENTS

| | | | |
|---|---|---|---|
| 4,674,065 A | 6/1987 | Lange et al. | 364/900 |
| 4,868,750 A | 9/1989 | Kucera et al. | 711/2 |
| 5,020,019 A | 5/1991 | Ogawa | 364/900 |
| 5,128,865 A | 7/1992 | Sadler | 704/2 |
| 5,159,552 A | 10/1992 | van Gasteren et al. | 704/1 |

(Continued)

FOREIGN PATENT DOCUMENTS

EP    0 364 180 A2    4/1990

(Continued)

OTHER PUBLICATIONS

Perry et al., "Discovering Similar Resources by Content Part-Linking", Proceedings of the Sixth International Conference on Information and Knowledge Management, published by ACM Press 1997, pp. 317-324.*

(Continued)

*Primary Examiner*—William L. Bashore
*Assistant Examiner*—Chau Nguyen
(74) *Attorney, Agent, or Firm*—Merchant & Gould

(57) ABSTRACT

Methods for recognizing strings, labeling the strings with a semantic category and providing e-commerce actions based on the category is disclosed. The semantic category may include a type label and other metadata. Recognizer plug-ins perform the recognition of particular strings in an electronic document. The recognizer plug-ins may be packaged with an application program module or they may be written by third parties to recognize particular strings that are of interest. Action plug-ins provide possible actions to be presented to the user based upon the type label associated with the string. Tradenames, trademarks, formal names or types of consumer products may be labeled and actions to buy the products may be presented. The metadata may be used to implement coupon and affiliate programs to reward frequent shoppers or frequent recommenders. Numerous other e-commerce opportunities are presented via the semantic category and the metadata.

18 Claims, 4 Drawing Sheets

U.S. PATENT DOCUMENTS

| | | | |
|---|---|---|---|
| 5,267,155 A | 11/1993 | Buchanan et al. | 364/419.14 |
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 715/540 |
| 5,341,293 A | 8/1994 | Vertelney et al. | 715/530 |
| 5,351,190 A | 9/1994 | Kondo | 704/8 |
| 5,386,564 A | 1/1995 | Shearer et al. | 395/650 |
| 5,392,386 A | 2/1995 | Chalas | 395/155 |
| 5,418,902 A | 5/1995 | West et al. | 715/503 |
| 5,446,891 A | 8/1995 | Kaplan et al. | 395/600 |
| 5,541,836 A | 7/1996 | Church et al. | 704/7 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,958 A | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 708/204 |
| 5,685,000 A | 11/1997 | Cox | 704/9 |
| 5,708,825 A | 1/1998 | Sotomayor | 395/762 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,822,720 A | 10/1998 | Bookman et al. | 704/3 |
| 5,826,025 A | 10/1998 | Gramlich | 395/200.47 |
| 5,832,100 A | 11/1998 | Lawton et al. | 382/100 |
| 5,845,077 A | 12/1998 | Fawcett | 709/221 |
| 5,855,007 A * | 12/1998 | Jovicic et al. | 705/14 |
| 5,859,636 A * | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | |
| 5,907,852 A * | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,498 A | 8/1999 | Schneck et al. | 705/54 |
| 5,944,787 A | 8/1999 | Zoken | 709/206 |
| 5,946,647 A * | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Bauregard et al. | |
| 5,987,480 A | 11/1999 | Donohue et al. | 715/501.1 |
| 5,991,719 A | 11/1999 | Yazaki et al. | 704/251 |
| 5,995,756 A | 11/1999 | Herrmann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/840 |
| 6,029,135 A | 2/2000 | Krasle | 704/275 |
| 6,029,171 A | 2/2000 | Smiga et al. | 707/102 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,085,201 A | 7/2000 | Tso | 707/505 |
| 6,088,711 A * | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 707/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A * | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 * | 3/2001 | Meyerzon et al. | 715/210 |
| 6,208,338 B1 | 3/2001 | Fischer et al. | 715/705 |
| 6,219,698 B1 | 4/2001 | Iannucci et al. | 709/221 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 * | 10/2001 | Sheth et al. | 715/505 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 * | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 * | 5/2002 | Jezewski et al. | 181/290 |
| 6,392,668 B1 * | 5/2002 | Murray | 715/738 |
| 6,396,515 B1 * | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | |
| 6,442,545 B1 * | 8/2002 | Feldman et al. | 707/6 |
| 6,442,591 B1 | 8/2002 | Haynes et al. | 709/206 |
| 6,456,304 B1 * | 9/2002 | Angiulo et al. | 715/779 |
| 6,470,091 B2 | 10/2002 | Koga et al. | 382/101 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | |
| 6,546,433 B1 | 4/2003 | Matheson | 709/318 |
| 6,553,385 B2 | 4/2003 | Johnson et al. | 707/104.1 |

| Patent/Pub No. | Date | Inventor | Class |
|---|---|---|---|
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,571,253 B1 | 5/2003 | Thompson et al. | 707/103 R |
| 6,601,075 B1 | 7/2003 | Huang et al. | 707/104.1 |
| 6,615,131 B1 | 9/2003 | Rennard et al. | 701/200 |
| 6,618,733 B1 | 9/2003 | White et al. | |
| 6,622,140 B1 | 9/2003 | Kantrowitz | 707/5 |
| 6,623,527 B1 | 9/2003 | Hamzy | 715/513 |
| 6,625,581 B1* | 9/2003 | Perkowski | 705/27 |
| 6,629,079 B1* | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,654,932 B1 | 11/2003 | Bahrs et al. | 715/507 |
| 6,658,623 B1 | 12/2003 | Schilit et al. | 715/705 |
| 6,687,485 B2 | 2/2004 | Hopkins et al. | 434/350 |
| 6,694,307 B2 | 2/2004 | Julien | 707/3 |
| 6,697,824 B1* | 2/2004 | Bowman-Amuah | 709/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1* | 5/2004 | Andreoli et al. | 719/313 |
| 6,741,994 B1 | 5/2004 | Kang et al. | 707/102 |
| 6,742,054 B1 | 5/2004 | Upton, IV | 710/6 |
| 6,745,208 B2 | 6/2004 | Berg et al. | 707/201 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,829,631 B1 | 12/2004 | Forman et al. | 709/202 |
| 6,859,908 B1* | 2/2005 | Clapper | 715/224 |
| 6,868,525 B1 | 3/2005 | Szabo | 715/738 |
| 6,874,125 B1* | 3/2005 | Carroll et al. | 715/705 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,901,402 B1* | 5/2005 | Corston-Oliver et al. | 707/101 |
| 6,904,560 B1* | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 | 9/2005 | Haley | 707/104.1 |
| 6,950,982 B1 | 9/2005 | Dourish | 715/512 |
| 6,957,385 B2 | 10/2005 | Chan et al. | 715/504 |
| 6,964,010 B1 | 11/2005 | Sharp | 715/507 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 | 1/2006 | Green et al. | 715/523 |
| 6,990,654 B2 | 1/2006 | Carroll, Jr. | 717/109 |
| 7,013,289 B2 | 3/2006 | Horn et al. | 705/26 |
| 7,028,312 B1 | 4/2006 | Merrick et al. | 719/330 |
| 7,051,076 B2 | 5/2006 | Tsuchiya | 709/206 |
| 7,082,392 B1 | 7/2006 | Butler et al. | 704/233 |
| 7,113,976 B2 | 9/2006 | Watanabe | 709/206 |
| 7,216,351 B1 | 5/2007 | Maes | 719/328 |
| 2001/0029605 A1 | 10/2001 | Forbes et al. | 717/11 |
| 2001/0041328 A1 | 11/2001 | Fisher | 434/157 |
| 2001/0042098 A1* | 11/2001 | Gupta et al. | 709/206 |
| 2001/0056461 A1 | 12/2001 | Kampe et al. | 709/201 |
| 2002/0002590 A1 | 1/2002 | King et al. | 709/206 |
| 2002/0003898 A1 | 1/2002 | Wu | 382/187 |
| 2002/0004803 A1 | 1/2002 | Serebrennikov | 715/513 |
| 2002/0023136 A1 | 2/2002 | Silver et al. | 709/206 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156792 A1 | 10/2002 | Gombocz et al. | 707/100 |
| 2002/0169802 A1 | 11/2002 | Brewer et al. | 707/513 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 345/744 |
| 2003/0046316 A1 | 3/2003 | Gergic et al. | 707/513 |
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1 | 5/2003 | Yu et al. | 705/35 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0172343 A1 | 9/2003 | Leymaster et al. | 715/500 |
| 2003/0192040 A1 | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0003389 A1 | 1/2004 | Reynar et al. | 717/178 |
| 2004/0006741 A1 | 1/2004 | Radja et al. | 715/513 |
| 2004/0039990 A1 | 2/2004 | Baker et al. | 715/505 |
| 2004/0133846 A1 | 7/2004 | Khoshatefeh et al. | 715/500 |
| 2004/0165007 A1 | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0120313 A1 | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| EP | 0481784 A2 | 4/1992 |
| EP | 0598511 A2 | 5/1994 |
| EP | 0 872 827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |

| | | |
|---|---|---|
| EP | 1376392 A2 | 1/2004 |
| EP | 1 447 754 A1 | 8/2004 |
| JP | 64-88771 | 4/1989 |
| JP | 05-174013 | 7/1993 |
| JP | 09-138636 | 5/1997 |
| JP | 2001-125994 | 5/2001 |
| JP | 2002163250 A | 6/2002 |
| WO | WO 95/07510 A1 | 3/1995 |
| WO | WO 99/17240 A1 | 4/1999 |
| WO | WO 00/54174 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Design methodology and formal validation of hypermedia documents; C.A.S. Santos, L.F.G Soares, G.L. de Souza and J.P. Courtiat; *Proceedings of the sixth ACM international conference on multimedia*, (1998) p. 39-48.

Constructing, organizing, and visualizing collections of tropically related Web resources; Loren Terveen, Will Hill and Brian Amento; *ACM Trans. Comput.-um. Interect.* 6, 1 (Mar. 1999) p. 67-94.

How to personalizae the Web; Rob Barrett, Paul P. Maglio and Daniel C Kellem; *Conference proceedings on human factors in computing systems* (1997) p. 75-82.

Clues; dynamic personalized message filtering; Matthew Marx and Chris Schmandt; *Proceedings of the ACM 1996 conference on computer supported cooperative work* (1996) p. 113-121.

Dynamic hyperlink generation for navigation in relational databases; Karl M. Goschka and Jurgen Falb; *Proceedings of the tenth ACM conference on hypertext and hypermedia: returning to our diverse roots* (1999) p. 23-24.

Percepual user interfaces: perceptual intelligence; Alex Pentland; *Commun. ACM* 43, 3 (Mar. 2000) p. 35-44.

Textual context analysis for information retrieval; Mark A. Stairmand; *Proceedings of the 20th annual international ACM SIGIR conference on research and development in information retrieval* (1997) p. 140-147.

*An XML framework for agent-based E-commerce*; Robert J. Glushko, Jay M. Tenenbaum and Bart Meltzer; Commun. ACM 42, 3 (Mar. 1999) p. 106.

Technique for Automatically Correcting Words in Text; Karen Kukich;*ACM Comput. Surv.*, 24, 4 (Dec. 1992); pp. 377-439.

Putting People First: Specifying Proper Names in Speech Interfaces; Matt Marx and Chris Schmandt; *Proceedings of the ACM Symposium on User Interface Software and Technology*, 1994; pp. 29-37.

Interface and execution models in the fluke kernel; Bryan Ford, Mike Hibler, Jay Lepreau, Roland McGrath and Patrick Tullman; *Proceedings of the third symposium on operating systems design and inplementation*, (1999) p. 101-115.

Exploring the applications user-expertise assessment for intelligent interfaces; Michel C. Desmarais and Jiming Liu; *Proceedings of the conference on human factors in computing systems.* (1993) p. 308-313.

Future directions in user-computer interface software; James D. Foley; *Conference proceedings on organizational computer systems*, (1991) p. 289-297.

Human-computer interface development: concepts and systems for its management H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center, Jim Foley; *Proceedings of the workshop on advanced visual interfaces.* (1994) p. 34-43.

Command management system for next-generation user input; M. Tsai, P. Reiher and G.J. Popek; *Proceedings of the seventh workshop on hottopics in operating systems.* (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."

U.S. Appl. No. 09/906,552, filed Jul. 16, 2001, entitled "Method and System for Providing Restricted Actions for Recognized Semantic Categories."

U.S. Appl. No. 09/906,467, filed Jul. 16, 2001, entitled "Application Program Interfaces for Semantically Labeling Strings and Providing Actions Based on Semantically Labeled Strings."

U.S. Appl. No. 09/907,418, filed Jul. 17, 2001, entitled "Method and System for Defining Semantic Categories and Actions."

U.S. Appl. No. 09/588,411, filed Jun. 6, 2000, entitled "Method and System for Semantically Labeling Strings and Providing Actions Based on Semantically Labeled Strings."

U.S. Appl. No. 10/141,712, filed May 9, 2002, entitled "Method, System, and Apparatus for Converting Dates Between Calendars and Languages Based Upon Semantically Labeled Strings."

U.S. Appl. No. 10/154,630, filed May 23, 2002, entitled "Method, System, and Apparatus for Converting Numbers Based Upon Semantically Labeled Strings."

U.S. Appl. No. 10/140,544, filed May 7, 2002, entitled "Method, System, and Apparatus for Converting Numbers Between Measurement Systems Based Upon Semantically Labeled Strings."

U.S. Appl. No. 10/155,680, filed May 23, 2002, entitled "Method, System, and Apparatus for Converting Currency Values Based Upon Semantically Labeled Strings."

U.S. Appl. No. 10/179,810, filed Jun. 25, 2002, entitled "Method, System, and Apparatus for Performing Custom Actions on Digital Content."

U.S. Appl. No. 10/178,680, filed Jun. 24, 2002, entitled "System and Method for Incorporating Smart Tags in Online Content."

U.S. Appl. No. 10/179,438, filed Jun. 25, 2002, entitled "Method and System for Dynamically Providing Actions Associated with Semantically Labeled Strings."

U.S. Appl. No. 10/184,298, filed Jun. 27, 2002, entitled "Method and System for Associating Actions with Semantic Labels in Electronic Documents."

U.S. Appl. No. 10/426,446, filed Apr. 29, 2003, Feinberg et al.

*Microsoft Computer Dictionary*, Microsoft, Microsoft Press, Fifth Edition, p. 409.

Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex.hypermart.net/books.bsd/501-504.html, pp. 1-20.

Kuenning, Geoff, "International Ispell," Version 3.1.00, Oct. 8, 1993, http:// www.rt.com/man/findaffix.1.html, http://www.csee.usf.edu/cgi-bin/man-cig?ispell, http://fmg-www.cs.ucla.edu/geoff/ispell.html, pp. 1-33.

Kuenning, Geoff, "Ispell, v. 3.1," http://theochem.ki.ku.dk/on_line_docs/ispell/ispell_1.html, pp. 1-6.

"UNIX Man Pages: sed," http://www.calpoly.edu/cgi-bin/man-cgi?spell+1, pp. 1-14.

McMahon, Lee. E., "SED—A Non-Interactive Text Editor," Bell Laboratories, Murray Hill, New Jersey 07974, pp. 1-15.

Beitner, N.D.; Hall, W.; Goble, C.A., "Multimedia Support and Authoring in Microcosm: An Extended Model," Dept. of Electronics and Computer Science, Univ. of Southampton, Southampton SO17 IBJ, UK; Dept. of Computer Science, Univ. of Manchester, Oxford Road, Manchester MI3 9PL, UK, pp. 1-12.

IBM Corporation, IBM Research Disclosure #368; "Multimedia Hyperlinks Automatically Created For Reference Documents," *IBM Technical Disclousre* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, pp. 1-385.

*User Manual For AddressMate and AddressMate Plus*, CoStar Corporation, AddressMate Software, 1994-1995, pp. 1-210.

Getting Results With Microsoft® Office 97, *Real World Solutions For The Work You Do*, Microsoft Corporation, pp. 1-703.

*InfoCentral*™ 7User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

Hewkin, "Smart Tags—the Distributed-Memory Resolution", IEE Review, Jun. 22, 1989, pp. 203-206.

Measuring Units Conversion Table—http://web.archie.org- 1997 Internet French Property, pp. 1-4.

IBM Technical Disclosure Bulletin, "National Language Support Enhancement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Development Smart Tag DLLs", MSDN Library, http://msdn.microsoft.com/library/default.asp?url=/library/en-us/dnsmarttag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/html/lat_xmltools_map_intro_zkqb.asp . . . , Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a . . . , Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a . . . , Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as . . . , Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Exterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Informational Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Enviorment (IDE)", http://web.archive.org/web/20020602032242/http:altova.com/products_ide.html, Jun. 2002, pp. 1-2.

"Altova markup your mind !" http://web.archive.org/web/20021204211721/http://altova.com/products_ide.html, Dec. 2002, pp. 1-3.

Arbortext, "Arbortext and Accessibility", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Sriram, V., "ComponentXchange: An E-Exchange for Software Components", Master Thesis, Citseer, May 2001, pp. i-v, 1-77.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.
Boon, "Concept Features in Re: Agent, An Intelligent Email Agent", Proceedings of the 2nd International Conference on Autonomous Agents, May 9-13, 1998, pp. 141-148.
"Smart Tags: Dumb Technology?", webreference.com, Online, Aug. 29, 2001, http://www.webreference.com/xml/column30/3.html, 3 pp.
"Being 'Smart' with Smart Tags in Office XP", Create for Mississippi, Aug. 2001, http://www.create.cett.msstate.edu/create/howto/smart_tags.pdf, 7 pp.
Harold, E.R., "XML: Extensible Markup Language", IDG Books Worldwide, Books 24x7.com printout, 1998, pp. 1-11.
Marais, Hannes, "Supporting Cooperative and Personal Surfing With a Desktop Assistant", 1997, ACM Press, pp. 129-138.
U.S. Appl. No. 10/164,960, filed Jun. 6, 2002, entitled "Providing Contextually Sensitive Actions and Help Content in Computer-Generated Documents".
U.S. Appl. No. 10/164,260, filed Jun. 5, 2002, entitled "Mechanism for Downloading Software Components from a Remote Source for Use by a Local Software Application".
U.S. Appl. No. 10/731,899, filed Dec. 9, 2003, entitled "Mechanism for Downloading Components Associated with XML Documents and Smart Documents".
U.S. Appl. No. 10/366,141, filed Feb. 13, 2003, entitled "Linking Elements of a Document to Corresponding Fields, Queries and/or Procedures in a Database".
U.S. Appl. No. 10/377,258, filed Feb. 28, 2003, entitled "Method and System for Enhancing Paste Functionality of a Computer Software Application".
U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".
U.S. Appl. No. 10/780,376, filed Feb. 17, 2004, entitled Methods and Systems for Providing Automatic.
U.S. Appl. No. 10/184,190, filed Jun. 27, 2002, entitled "System and Method for Providing Namespace Related Information".
U.S. Appl. No. 10/183,317, filed Jun. 25, 2002, entitled "System and Method for Issuing a Message to a Program".
U.S. Appl. No. 11/396,937, filed Apr. 3, 2006, entitled "Automatically Adding Proper Names to a Database".
U.S. Official Action dated Sep. 7, 2006 cited in U.S. Appl. No. 10/155,680.
U.S. Official Action dated Apr. 10, 2007 cited in U.S. Appl. No. 09/907,418.
European Communication dated Apr. 19, 2006 in EP Application No. 05 000 506.5-1527.
European Communication dated Feb. 19, 2007 in EP Application No. 04003683.2-2211.
Anonymous, "Adding Data from Other Sources in PowerPoint 2002,"Jul. 2002, Internet article, XP-002420700, A Professional Approach Series the E-Zine Approach, http://www.glencoe.com/ps/computered/pas/article.php4?articleld-437, 8 pgs.
F.C. Rice, "Transform XML Files with XSLT When Importing into Microsoft Excel 2002," Jul. 2001, Internet article, XP-002420701, http://msdn2.microsoft.com/en-us/library/aa140055(office.10.d=printer).aspx, 9 pgs.
L. Johnson, "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
U.S. Official Action dated Mar. 9, 2007 in U. S. Appl. No. 10/426,446.
U.S. Official Action dated Mar. 12, 2007 in U.S. Appl. No. 10/141,712.
European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
U.S. Official Action dated Feb. 21, 2007 cited in U.S. Appl. No. 10/366,141.
European Communication dated Nov. 17, 2006 in EP 03 011 851.7-2211.
U.S. Official Action dated Dec. 20, 2006 in U.S. Appl. No. 10/154,630.
U.S. Final Official Action dated Dec. 26, 2006 in U.S. Appl. No. 10/179,810.
U.S. Official Action dated Jan. 5, 2007 in U.S. Appl. No. 10/183,717.
U.S. Official Action dated Jan. 11, 2007 in U.S. Appl. No. 10/184,190.
U.S. Official Action dated Jan. 25, 2007 in U.S. Appl. No. 10/608,267.
European Communication dated Nov. 9, 2006 in EP 03010292.5.
"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.
"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.
U.S. Office Action dated Nov. 9, 2006 cited in U.S. Appl. No. 10/184,298.
U.S. Office Action dated Nov. 15, 2006 cited in U.S. Appl. No. 10/179,438.
European Communication dated Sep. 25, 2006 in EP 03 01 4181.
World Wide Web Consortium, "Document Object Model (DOM) Level 2 Events Specification, Version 1.0", http://www.w3.org/TR2000/REC-DOM-Level-2-Events-20001113/DOM2-Events.pdf, Nov. 2000, 50 pp.
World Wide Web Consortium, "Document Object Model (DOM) Level 2 Core Specification, Version 1.0", http://www.w3.org/TR2000/REC-DOM-Level-2-Core-20001113/DOM2-Core.pdf, Nov. 2000, 107 pp.
U.S. Final Official Action dated Oct. 19, 2006 cited in U.S. Appl. No. 09/906,467.
U.S. Official Action dated Sep. 28, 2006 cited in U.S. Appl. No. 10/608,267.
U.S. Official Action dated Oct. 6, 2006 cited in U.S. Appl. No. 10/140,544.
U.S. Official Action dated Oct. 10, 2006 cited in U.S. Appl. No. 09/841,265.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Report (conducted by Austrian Patent Office) dated Jan. 25, 2008 in SG Application No. 200500214-2.
Chinese Official Action dated Jan. 4, 2008 cited in Chinese Application No. 200510009487.0.
Chinese Official Action dated Dec. 28, 2007 cited in Application No. 200410005390.8.
WEI Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
Russian Official Action dated Jan. 11, 2008 cited in Russian Application No. 2004105880/09(006292).
V. Doroth et al., "Modern Computer Vocabulary," St. Petersburg, BHV-Peterburg, 2001, pp. 465 (with English language translation).
Malaysian Search Report dated Aug. 2, 2007 cited in Malaysian Application No. PI 20040265.

U.S. Office Action dated Sep. 27, 2007 cited in U.S. Appl. No. 10/608,267.
European Communication dated Sep. 25, 2007 cited in European Application No. 03 014 181.6-1243.
Japanese Official Action dated Oct. 19, 2007 cited in Japanese Application No. 2003-128417.
Rubin, Charles, "Microsoft Word 2000 Official Manual," First Edition, Nikkei BP Soft Press, Inc., Aug. 2, 1999, pp. 215-217.
U.S. Final Office Action dated Dec. 7, 2007 cited in U.S. Appl. No. 10/426,446.
U.S. Office Action dated Jan. 25, 2008 cited in U.S. Appl. No. 10/608,267.
U.S. Final Office Action dated Jul. 12, 2007 cited in U.S. Appl. No. 10/184,298.
U.S. Office Action dated Jul. 13, 2007 cited in U.S. Appl. 10/154,630.
U.S. Office Action dated Jul. 20, 2007 cited in U.S. Appl. No. 09/841,265.
U.S. Final Office Action dated Jul. 26, 2007 cited in U.S. Appl. No. 10/164,960.
U.S. Office Action dated Aug. 10, 2007 cited in U.S. Appl. No. 10/179,810.
U.S. Office Action dated Sep. 10, 2007 cited in U.S. Appl. No. 10/179,438.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
U.S. Appl. No. 11/924,856, filed Oct. 26, 2007 entitled "Providing Contextually Sensitive Tools and Help Content in Computer-Generated Documents".
U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
U.S. Official Action dated May 14, 2007 cited in U.S. Appl. No. 09/906,552.
U.S. Final Offical Action dated May 18, 2007 cited in U.S. Appl. No. 10/155,680.
U.S. Official Action dated May 30, 2007 cited in U.S. Appl. No. 09/906,467.
U.S. Final Official Action dated Jun. 15, 2007 cited in U.S. Appl. No. 10/731,899.
Blaheta et al., "Assigning Function Tags to Passed Text," Morgan Kaufmann Publishers Inc., 2000, pp. 234-240.
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
Polish Official Letter dated Jun. 24, 2008 cited Polish Application No. P 365553.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 12, 2008 cited in U.S. Appl. No. 10/426,446.
U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.

* cited by examiner

METHOD AND SYSTEM FOR PROVIDING ELECTRONIC COMMERCE ACTIONS BASED ON SEMANTICALLY LABELED STRINGS

REFERENCE TO RELATED APPLICATIONS

This is a continuation-in-part of U.S. patent application Ser. No. 09/588,411, entitled "METHOD AND SYSTEM FOR SEMANTICALLY LABELING STRINGS AND PROVIDING ACTIONS BASED ON SEMANTICALLY LABELED STRINGS", filed Jun. 6, 2000, which is incorporated by reference herein.

TECHNICAL FIELD

This invention relates to a method and system for providing electronic commerce actions that may be performed based on semantically labeled strings.

BACKGROUND OF THE INVENTION

Electronic documents typically include semantic information that would be helpful if the information was recognized as such. Recognition and use of this semantic information could result in increased interoperability between desktop software applications and other desktop applications and/or web-based applications. Recognition of this semantic information may also provide benefits in electronic commerce.

Electronic commerce is increasing in popularity as users become accustomed to transacting business over the Internet. A fundamental way for a retailer to generate traffic to its website is via a hyperlink. Although hyperlinks are useful, they do have some drawbacks. One drawback of hyperlinks is that they are static. In other words, a hyperlink navigates a user's web browser to a single webpage without regard for the user's interests. The user is expected to decide to which webpage to navigate to and it is a one-to-one navigation. Moreover, hyperlinks are typically not automatically applied to document content (although some programs do recognize them as hyperlinks after they are entered by a user).

Thus, there is a need for a dynamic e-commerce tool that may be automatically applied to documents that a user creates, receives or views.

SUMMARY OF THE INVENTION

The present invention provides a method and system for recognizing strings, labeling the strings with a semantic category and providing e-commerce actions based on the category. The semantic category may include a type label and other metadata. Recognizer plug-ins perform the recognition of particular strings in an electronic document. The recognizer plug-ins may be packaged with an application program module or they may be written by third parties to recognize particular strings that are of interest. Action plug-ins provide possible actions to be presented to the user based upon the type label associated with the string. Tradenames, trademarks, formal names or types of consumer products may be labeled and actions to buy the products may be presented. The metadata may be used to implement coupon and affiliate programs to reward frequent shoppers or frequent recommenders. Numerous other e-commerce opportunities are presented via the semantic category and the metadata.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
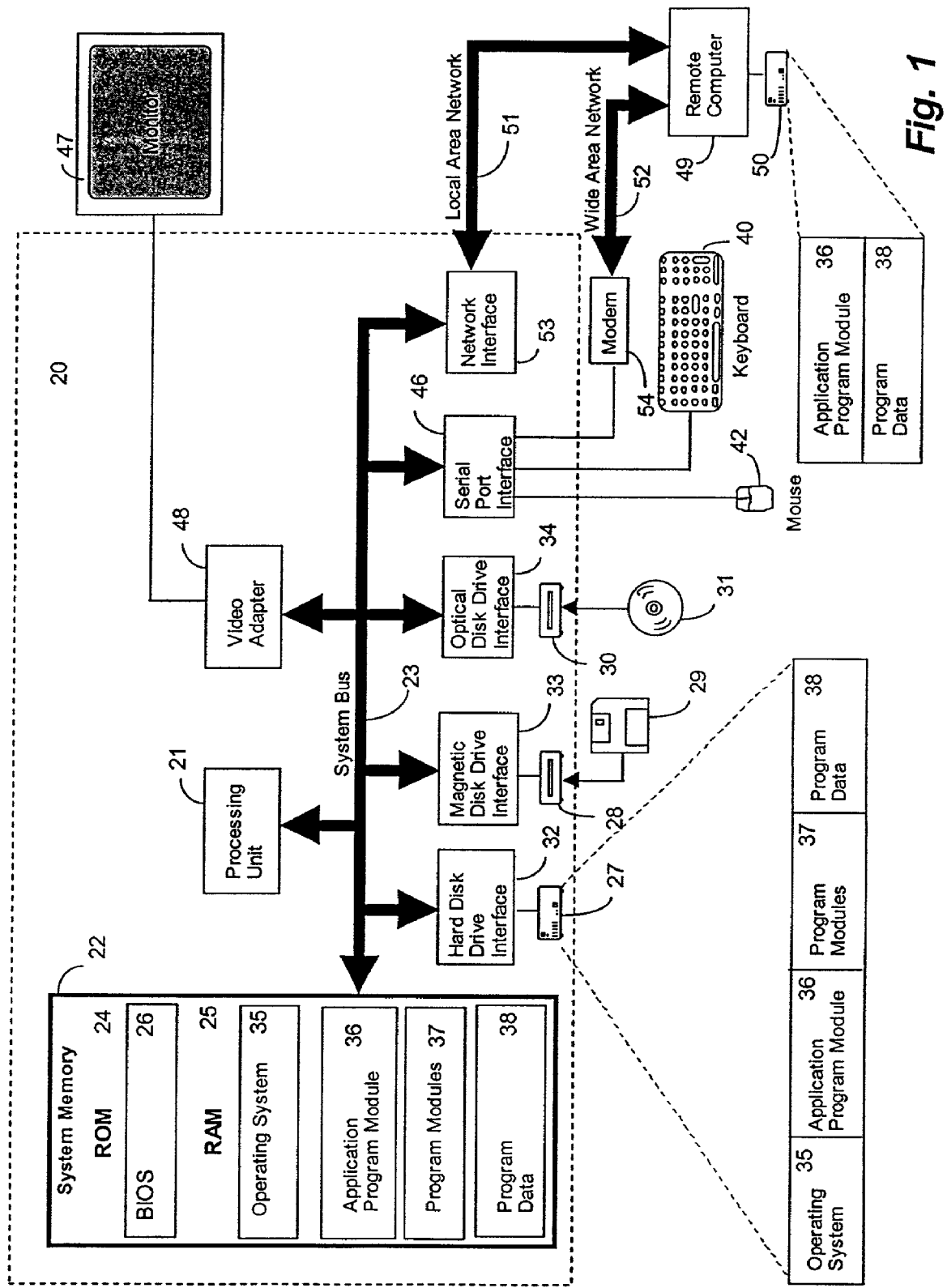
FIG. 1 is a block diagram of a computer that provides the exemplary operating environment for the present invention.

The present invention is directed toward a method and system for semantically labeling strings of text and providing a selection of electronic commerce actions that may be performed based on the semantically labeled strings. A string is defined as a data structure composed of a sequence of characters usually representing human-readable text.

In one embodiment, the invention is incorporated into a suite of application programs referred to as "OFFICE", and more particularly is incorporated into a preferred word processing application program entitled "WORD 10.0", a preferred spreadsheet application program entitled "EXCEL 10.0", a preferred e-mail application program entitled "OUTLOOK 10.0" and a preferred web browser application program entitled "INTERNET EXPLORER 6", all marketed by Microsoft Corporation of Redmond, Wash. Briefly described, the preferred application programs allow a user to create and edit electronic documents by entering characters, symbols, graphical objects, and commands.

Strings are recognized and annotated, or labeled, with a type label. After the strings are annotated with a type label, application program modules may use the type label and other metadata to provide users with a choice of electronic commerce actions. If the user's computer does not have any actions associated with that type label, the user may be provided with the option to surf to a download Uniform Resource Locator (URL) and download action plug-ins for that type label.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or other type of program module), program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
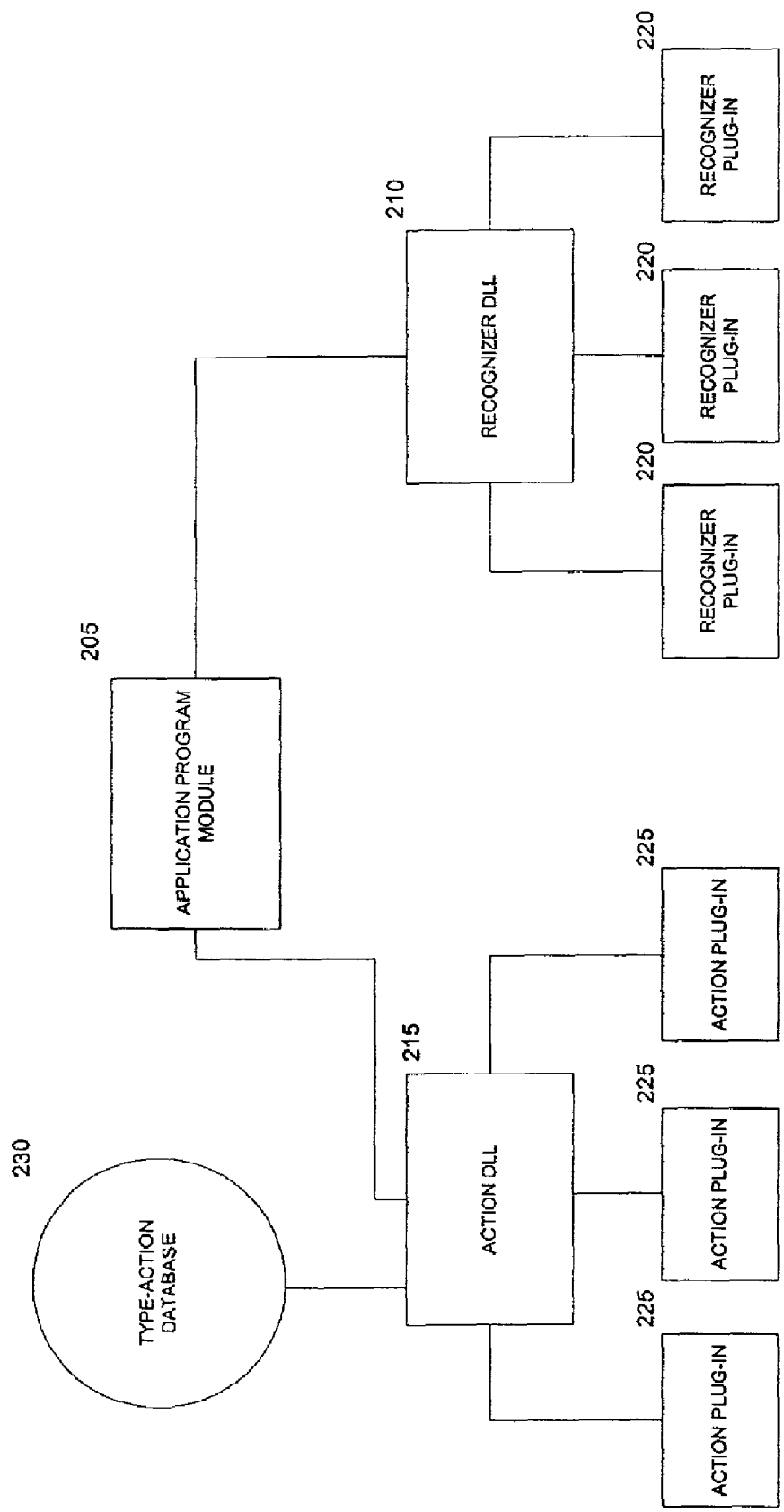
FIG. 2 is a block diagram illustrating an exemplary architecture for use in conjunction with an embodiment of the present invention.

FIG. 2 is a block diagram illustrating an exemplary architecture 200 for use in conjunction with an embodiment of the present invention. The architecture includes an application program module 205, such as word processor program module 37 (FIG. 1). The application program module 205 is able to communicate with a recognizer dynamic-link library 210 (hereinafter recognizer DLL) and an action dynamic-link library 215 (hereinafter action DLL) as a user is creating or editing an electronic document. The recognizer DLL 210 controls a number of recognizer plug-ins 220. The action DLL 215 controls a number of action plug-ins 225. The action DLL also controls a type-action database 230.

In a preferred embodiment, the action plug-ins and recognizer plug-ins are Automation Servers. Automation Servers are well-known software components which are assembled into programs or add functionality to existing programs running on the Microsoft WINDOWS® operating system. Automation Servers may be written in a variety of computing languages and may be un-plugged from a program at run time without having to recompile the program. It should also be understood that, in a preferred embodiment, the action DLL and recognizer DLL are merged into a single DLL.

The recognizer DLL 210 handles the distribution of strings from the electronic document running on the application program module 205 to the individual recognizer plug-ins 220. The recognizer plug-ins 220 recognize particular strings in an electronic document, such as a word processing document, a spreadsheet document, a web page, etc. The recognizer plug-ins 220 may be packaged with the application program module 205 or they may be written by third parties to recognize particular strings that are of interest. Typically, the recognizer DLL 210 passes strings to the recognizer plug-ins 220 in one paragraph or cell value increments.

As part of recognizing certain strings as including semantic information, the recognizer plug-ins 220 determine which strings are to be labeled and how they are to be labeled. After receiving these results from the various recognizer plug-ins 220, the recognizer DLL 210 sends semantic categories to the application program module. In a preferred embodiment, a semantic category comprises the recognized string, a type label, and a download URL. A semantic category may also comprise metadata. The recognizer plug-ins 220 each run separately and the recognizer DLL 210 is responsible for handling the asynchronicity that results from different recognizer plug-ins returning results with different delays.

After a string is labeled by a recognizer plug-in 220 and a semantic category is sent to the application program module 205, the user of the application program module 205 will be able to execute actions that are associated with the type label of the semantic category. The action DLL 215 manages the action plug-ins 225 that are run to execute the actions. As with the recognizer plug-ins 220, the action plug-ins 225 may be packaged with the application program module 205 or written by third parties to perform particular actions that are of interest to the third party. The action plug-ins provide possible actions to be presented to the user based upon the type label associated with the string. The action DLL 215 determines what type label the semantic category includes and cross-references the type label in the type-action database 230 with a list of actions to determine what actions to present to the user. It should be understood that, in a preferred embodiment, the type-action database is not used. Instead, the list of actions is dynamically generated for each type by looking in the registry to determine which actions are installed and then querying the action DLLs to determine which types they apply to.

After the user chooses an action, the action DLL 215 manages the appropriate action plug-ins 225 and passes the necessary information between the action plug-ins and the application program module 205 so that the action plug-in may execute the desired action. Typically, the application program module sends the action DLL an automation request to invoke the action the user has selected.

As described above, the combination of the recognized string, type label, metadata and download URL is referred to herein as a semantic category. The type label is a semantic information label. The semantic category may also comprise metadata, which are hidden properties of the semantic category. An example of a semantic category may clarify the definition. Suppose a user enters the text "Gone With the Wind" into an electronic document. The string "Gone With the Wind" may be identified as a semantic category of type label "Book Title" and of type label "Movie Title". In addition, metadata such as the ISBN number may be returned by the recognizer plug-in to the application program module as part of the semantic category. A download URL may be provided with the type labels "Book Title" and "Movie Title" in case the user's machine has not stored action plug-ins for these type labels. For example, an action for the type label "Book Title" may be "Buy this Book" from an online retailer. If the user does not have the action plug-in DLL 225 corresponding to "Buy this book", then the download URL may be used to navigate the user's web browser to an appropriate website to download this action plug-in. In other implementations of the invention, multiple download URLs may be provided for a single type label.

It should also be understood that the present invention, in a preferred embodiment, also recognizes sequences of capitalized words that contain function words, and which are likely to be special, but for which there is no type label information. These strings are typically labeled by a grammar checker program module.

The actions provided for a semantic category may utilize both the type label and the text of the recognized string. For example, a word processor program module may use a grammar checker as a recognizer plug-in to label strings that are person names. After a string has been labeled as a person's name, the word processor program module may, through a standard user interface mechanism, allow users to execute pertinent actions, such as looking up the person's name in the contacts folder in a personal information manager program module, sending electronic mail, or searching for the person's name in an HR database.

Having described an exemplary architecture, an exemplary method 300 for semantically labeling strings during document creation will be described below in reference to FIGS. 2 and 3.

Method for Semantically Labeling Strings During Document Creation

Figure 3:
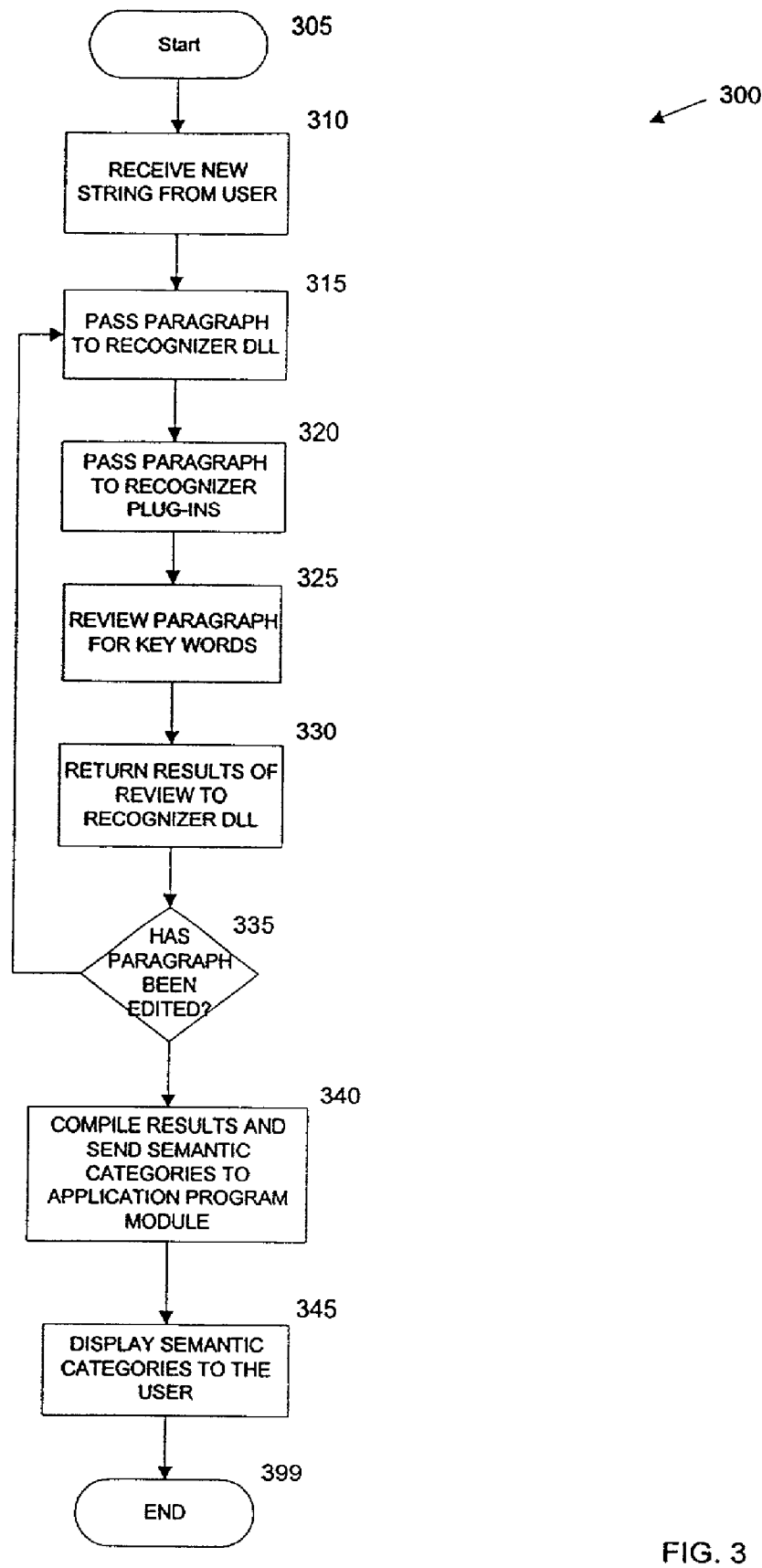
FIG. 3 is a flow chart illustrating a method for semantically labeling strings during creation of an electronic document.

FIG. 3 is a flow chart illustrating a method 300 for semantically labeling strings during creation of an electronic document. Those skilled in the art will appreciate that this is a computer-implemented process that is carried out by the computer in response to input from the user and instructions provided by a program module.

Referring to FIG. 3, the method 300 begins at start step 305 and proceeds to step 310 when a user opens an electronic document in application program module 205. In a preferred embodiment, the electronic document is a word processing document or a spreadsheet document. However, the invention is not limited to either of these specific types of electronic documents.

At step 310, the application program module 205 receives a new string, such as when the user enters a new paragraph into the electronic document or edits a previously entered paragraph. The method 300 then proceeds to step 315.

At step 315, the paragraph containing the new string is passed from the application program module 205 to the recognizer DLL 210. The recognizer DLL is responsible for communicating with the application program module, managing the jobs that need to be performed by the recognizer plug-ins, receiving results from the recognizer plug-ins and sending semantic category information to the application program module. At boot time, the recognizer DLL communicates with its recognizer plug-ins to determine what languages it supports, what types it can apply, etc. It should be understood that, in a preferred embodiment, a paragraph is passed to the recognizer DLL at step 315. However, in alternative embodiments, a sentence, the contents of a spreadsheet cell, a section of the document, the entire document, etc. may be passed to the recognizer DLL. In other words, the present invention is not limited to simply passing a paragraph to the recognizer DLL. The method 300 then proceeds to step 320.

Still referring to step 315, the application program module 205 typically sends one paragraph at a time to the recognizer DLL. In addition, in a preferred embodiment, a grammar checker program module sends all semantic categories (without type labels) to the recognizer DLL that have been identified by the grammar checker program module. Passing these semantic categories (without type labels) to the recognizer DLL is important because doing so saves each recognizer plug-in from needing to decide whether something is a capitalized string interspersed with function words (a task that would require writing a number of regular expressions: Cap Cap Unc Cap; Cap Unc Cap; etc.). If a label is applied by a recognizer plug-in to a string the grammar checker program module labeled, the grammar checker label will then be removed.

At step 320, during idle time, the paragraph (and information from the grammar checker program module) is passed to the recognizer plug-ins. The method then proceeds to step 325.

It should be understood that, in a preferred embodiment, the recognizer DLL 210 maintains a job queue. If before the recognizer DLL 210 sends the paragraph to the recognizer plug-ins 220 the user edits the paragraph, then the job containing the edited paragraph is deleted and is not sent to the recognizer plug-ins. Then, a new job enters the queue at step 315 after the edited paragraph is received at step 310. This job deletion is necessary to prevent the recognizer plug-ins from performing unnecessary work on a paragraph that has been edited.

At step 325, the recognizer plug-ins are executed on the paragraph to recognize keywords or perform other actions defined by the recognizer plug-in. As part of executing the recognizer plug-in, the paragraph may be broken into sentences by the recognizer plug-in. However, each recognizer plug-in is responsible for its own sentence-breaking. After the keywords are found at step 325, then the method proceeds to step 330.

At step 330, the results from each of the recognizer plug-ins are received by the recognizer DLL. The method then proceeds to decision step 335.

At decision step 335, it is determined whether the paragraph that has been reviewed by the recognizer plug-ins has been edited after the paragraph was sent to the recognizer DLL. If so, then the method 300 returns to step 315 and the edited paragraph is received by the recognizer DLL from the application program module. If not, then the method proceeds to step 340.

At step 340, the results from the recognizer plug-ins are compiled into semantic categories by the recognizer DLL and the semantic categories are sent to the application program module. At step 345, the application program module displays the semantic categories to the user in the electronic document. The method 300 then ends at step 399.

As should be understood from the above description, the architecture for recognizing semantic categories permits third parties to develop recognizer plug-ins to identify strings of one or more particular types. The recognizer plug-ins communicate with the application program module and receive a string from the application program module. The recognizer plug-ins may apply recognition algorithms to the string and communicate the identity of recognized strings back to the application program module.

After a string is labeled with a particular type label, the user will be able to execute action plug-ins that pertain to that type label. The action plug-ins preferably are COM objects that are executed via communication between the application program module and the action DLL. Parameters necessary to execute the action (the HTML of the string labeled as being of a particular type, the HTML of the string representing the current selection) will be passed from the application program module to the action DLL and, in turn, passed to the action plug-in.

Actions Assigned to Type Labels

An architecture for identifying and executing a set of actions associated with a semantic category may also be provided. This architecture comprises actions that apply to a particular type label (e.g. an action for book titles may be "Buy this book from shop.Microsoft.com") and executing those actions when the user so desires. An action is a user-initiated function applied to a typed string. For example, adding a name to the contacts folder is one action possible for a type label "Person name".

There is power and flexibility that results from allowing third party vendors, such as IT professionals, to design and write recognizer plug-ins and action plug-ins for deployment within an organization or for deployment on the World Wide Web. Some example actions that may be executed include:

Schedule a meeting
Create task
Display calendar
Add to contacts folder
Look up in contacts folder, address book, Windows Address Book (WAB), Global
Address List (GAL), etc.
Insert address into document
Send mail to
Display EXPEDIA map
Stock quote lookup
Send instant message to Different actions may be assigned to different type labels and these type label-action assignments may be stored in the type-action database 230. Table 1 below illustrates some possible type label-action pairings.

TABLE 1

| Type Labels | Actions |
| --- | --- |
| Person name | Show contact info |
|  | Add to contacts |
|  | E-mail |
|  | Insert address into document |
|  | Send instant message to |
| Date | Show calendar for that day |
|  | New task with that due date |
|  | Schedule meeting that day |
| Place | Display EXPEDIA map |
|  | Add to contacts |
| Address | Add to contacts |
| Phone number | Add to contacts |
| E-mail | Add to contacts |
| Date | Schedule a meeting |
| Task | Schedule a task |
| Meeting | Schedule a meeting |

For each type label, the type-action database 230 may store a download URL specified by the creator of the type label that users who do not have action-plug-ins or recognizer plug-ins for that semantic category type can go to in order to get action plug-ins and/or recognizer plug-ins. For example, the download URL for the type label "Book Title" might be microsoft-.com/semanticcategories.asp. Once at that web page, a user may be offered downloads of various action plug-ins and recognizer plug-ins. There may also be an option on the user interface to navigate to the download URL so that recipients of documents with semantic categories can easily get the action plug-ins for those semantic categories.

Storing Semantic Categories

Semantic categories may be stored as part of the electronic document along with other document information and may be available when a document is transmitted from one computer to another computer. In a preferred embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents.

Checking a "Save semantic categories as XML properties" checkbox (off by default) will write out the text of all of the semantic categories in the document and their labels in the header of the HTML file in XML (that is using the same tags as are used inline, but surrounded by <xml> And </xml>) for easy identification and parsing by search engines and knowledge management systems.

Semantic categories may be saved as a unique namespace plus a tag name. A namespace is an XML construct for uniquely identifying a group of XML tags that belong to a logical category. Thus, every semantic category is uniquely identified by its nametag (e.g., "streetname") in addition to its namespace (e.g., "schemas-microsoft-com:outlook:contact")

Although the method 300 described above is one method for identifying semantic categories, there may be other mechanisms for identifying semantic categories. One mechanism is a grammar checker program module (not shown) connected to word processor program module 37. Another mechanism is receiving a semantic category from another electronic document. For example, when text containing a semantic category is copied from one electronic document and pasted into another electronic document of the word processor program module 37, the information identifying the semantic category is preserved and copied along with the copied text.

Displaying Semantic Categories to the User

Figure 4:
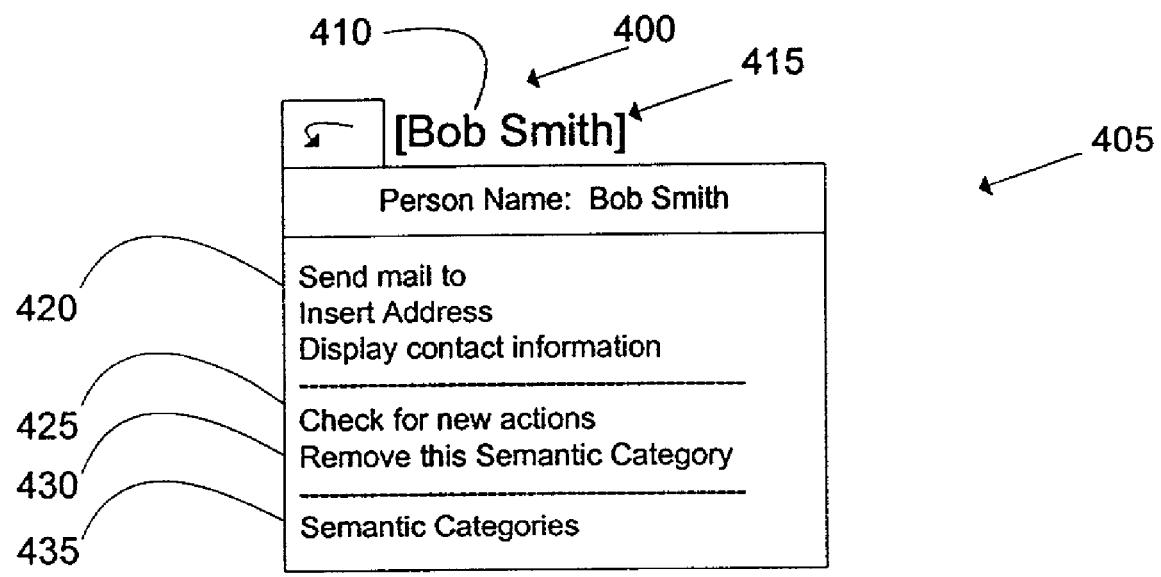
FIG. 4 is an illustration of a display of a semantic category and its associated dropdown menu.

Referring now to FIG. 4, an illustration of a display of a semantic category 400 and its associated dropdown menu 405 will be described. It should be understood that FIG. 4 is an illustration of a semantic category 400 and dropdown menu 405 as displayed to a user by the application program module 205.

The string 410 associated with semantic category 400 is the string "Bob Smith". As shown in FIG. 4, the string 410 of a semantic category 400 may be identified to the user by brackets 415. Of course, many other devices such as coloring, underlining, icons, etc. may be used to indicate to the user that a particular string is a semantic category.

In a preferred embodiment, when the user hovers a cursor over the string 410 or places the insertion point within string 410, then dropdown menu 405 is displayed to the user. The dropdown menu may display a list of actions associated with a semantic category. The dropdown menu may appear above and to the left of the semantic category string.

Typically, the first line of the dropdown menu indicates which string is the semantic category string (Bob Smith in FIG. 4) and what type the semantic category is (Person name in FIG. 4). Listed below the first line are actions 420 available for the semantic category type, such as "Send mail to . . . ", "Insert Adress", and "Display contact information . . . ".

The first item on the drop down menu below the separator line is "Check for new actions . . . " 425. "Check for new actions . . . " 425 will appear only for semantic categories whose download URL is available to the application program module. If selected, "Check for new actions . . . " 425 uses the semantic category download URL to navigate the user's web browser to the homepage for the semantic category type applied to the string. For example, suppose new actions have been defined for the semantic category type "person name". If so, then new actions will be downloaded to the user's computer after selecting "Check for new actions . . . " 425. "Check for new actions . . . " 425 will be grayed out if a download URL is unavailable for the semantic category.

If selected, the "Remove this semantic category" item 430 deletes the semantic category label from the string. If selected, the "Semantic categories" item 435 navigates the user to the semantic categories tab of the autocorrect dialog.

It should be understood that the application program module sends a request to the action DLL to determine which actions are shown with each semantic category type.

Actions Performed in Association with Semantic Categories

There are a number of functions that users perform on typed data that preferred word processor program module 37 and semantic categories will make easier. The functions fall into three primary categories:
 1) interacting with personal information manager contacts, tasks, meetings, and mail;
 2) interacting with properties on the World Wide Web or a corporate intranet; and
 3) interacting with other applications on the client machine.

A single string may be associated with multiple semantic categories. Every semantic category has a type label with one or more action plug-ins defined for the type label. For example, the "Address" type label may have the "Open in Mappoint", "Find with Expedia Maps" and "Add to my Address Book" actions associated with it and each of these actions may have a different action plug-in to execute the action.

The actions assigned to type labels also depend on the computer that the application program module is running on. Thus, if a computer has three actions registered for the type label "Address", then all strings with an "Address" type label will be assigned to three actions. However, if one of these semantic categories is sent to a computer which has only two actions registered for the "Address" type label, then the user will only be exposed to two actions for this semantic category.

Nesting of Semantic Categories

In an embodiment of the present invention, semantic categories may be nested inside each other. For example, the string "George Washington" may include a semantic category with type label "Person Name" for the span "George Washington State" and a semantic category with type label "State" for the span "Washington". Moreover, two semantic categories may cover exactly the same span. For example, the string "George Washington" may include a semantic category with type label "Person Name" and a semantic category with type label "President".

Because the preferred application program module 37 will support labeling a single string with multiple type labels (e.g. Bob Smith could be a semantic category labeled as a "Person Name" and labeled as a "Microsoft employee"), the preferred application program module 37 will use cascade menus on the dropdown menu if multiple semantic category types are assigned.

For example, the cascade menu may include a list of the type labels included in the recognized string. This list may include a type label "Person Name" and a type label "Microsoft employee".

It should be understood that a cascade menu may be used to allow the user to select which type label the user is interested in and to further select an action after selecting the type label.

In-document User Interface to Indicate Semantic Categories

As described above with reference to FIG. 4, the application program module may include the option to display an in-document user interface to indicate the location of semantic categories. This in-document user interface may use a colored indication to indicate the location of a semantic category, such as the brackets 415 in FIG. 4. The in-document user interface will also be able to show nesting of semantic categories. For example, if Michael Jordan is labeled as a semantic category with type label "Person Name", Michael is a semantic category with type label "First Name" and Jordan is a semantic category with type label "Last Name", the document may look like this with the brackets indicating semantic categories:
 [[Michael][Jordan]]

Of course, the in-document user interface may be any sort of indication. For example, in the "EXCEL" spreadsheet application program, the interface comprises a triangle in the lower right hand portion of a cell to indicate that one or more semantic categories are present in the cell.

Although the present invention has been described as implemented in a word processing program module, it should be understood that the present invention may be implemented in other program modules, including, but not limited to, HTML authoring programs and programs such as the "POWERPOINT"® presentation graphics program and the "OFFICE" program module, both marketed by Microsoft Corporation of Redmond, Wash.

As described above, the semantic category may also include metadata returned by the recognizer plug-ins. For example, a recognizer plug-in that recognizes the titles of books may return as metadata an ISDN book number when it recognizes the title of a book. The ISDN book number metadata may then be used to provide actions. Metadata may also be used to disambiguate for actions and searches. For example, suppose a recognizer DLL is linked to a corporate employee database to recognize names. When the recognizer DLL recognizes "Bob Smith", it may store "employeeID=12345" as metadata in the background. Then, when an action is fired, the text in question will be known to reference Bob Smith, employee no. 12345 rather than Bob Smith, employee no. 45678. Also, the metadata may allow searches to be performed independent of the actual text in a document. So, a search may be conducted on "Robert Smith" by looking for employee 12345 in the employee databases and by performing a search on the metadata for employee number 12345 to find documents with "Bob Smith" in them. There are also numerous other functions for metadata. For instance, DHTML could be inserted so special tricks may be performed within a web browser. Additionally, data used by other actions may be inserted such as someone's e-mail address that could be used by the send-mail-to action, a normalized version of the date could be stored to easily interact with a personal information manager, etc.

Providing Electronic Commerce Actions

The present invention uses semantic categories to provide electronic commerce related functions.

One key aspect of recognizer plug-ins is that, in addition to applying category information to a string, they can also associate arbitrary metadata with that string. For example, the recognizer plug-in for recognizing person names might also embed the person's employee id number in the metadata of the semantic category. The benefit of embedding additional metadata is that the pool of metadata is available to the action plug-ins. Thus, for example, an action plug-in for sending someone an e-mail might most easily be written if the employee id number were embedded in the semantic category as metadata, along with the name, assuming that employee e-mail addresses were derived from employee numbers.

There are numerous uses of semantic categories and numerous uses of the mechanism for embedding arbitrary metadata along with a recognized string of a semantic category. One use of particular importance is using the metadata in conjunction with electronic commerce, or e-commerce. Semantic categories are particularly useful because they can be embedded in web pages and in HTML mail messages, two of the main avenues of e-commerce in use today. Third parties will find semantic categories particularly useful because of the ease of developing recognizer plug-ins and action plug-ins.

It should be understood from the foregoing description that semantic categories are a technology that allow for a new navigation model on the World Wide Web and in applications. A hyperlink allows for a static, one-to-one navigation model and is typically not applied automatically to document content. In contrast, semantic categories allow for a one-to-many navigation model (a word or phrase with a single type label applied can offer multiple actions). For example, using the present invention, a user may have the option to buy a book, look for books by the same author or give the book as a gift. Moreover, using the present invention, a single string may have multiple type labels applied, so "Grapes of Wrath" could be labeled as both a book and a DVD and the user would be presented with options related to both of these type labels, such as buy the book, buy the DVD, etc.

Semantic categories also improve on the hyperlink by being dynamic. Actions can perform arbitrary computation in addition to performing navigation within a web browser. For example, an action could communicate to a web server the identity of the user in the form of their customer number without using cookies. Or, an action could communicate with a web service to notify an e-commerce retailer that the user was directed to their site via semantic categories and, going one step further, could even communicate the type of semantic category from which the navigation began as well as the contents of the semantic category, which could include information about who authored the document containing the semantic category.

Another example of semantic categories being dynamic is that they can contain client-side logic to replace server-side logic and/or redirection services. For example, an e-commerce provider might want to provide the user with the contents of their web site in the appropriate language. The e-commerce provider could do this by showing the user an initial web page and asking the user to choose the appropriate language, or the provider could show the user a web page and run some script to check the language of the user's web browser. However, both of these approaches require the use of an interim web page. Using semantic categories, this information can be passed to the web site at run time, which is an improvement over the static nature of Universal Resource Locators (URLs).

Furthermore, semantic categories are an improvement over hyperlinks in that they are applied automatically. Some applications automatically recognize hyperlinks when they are typed and turn them into links. However, semantic categories allow developers to specify specific strings that should be labeled when the user types them (not necessarily just strings that are hyperlinks). For example, an online CD retailer might want all names of bands labeled in web pages, documents and mail messages when the user types them. After labeling the names of bands, the retailer could direct the user to a web site with a single click rather than forcing the user to 1) remember the name of their company, 2) remember the URL of their web site, 3) enter that URL in the browser and 4) search for the band on the retailer's website.

Thus, as should be understood from the foregoing description, by virtue of the dynamic nature of semantic categories a number of e-commerce scenarios are enabled and a number of other scenarios become much simpler.

E-commerce Uses of Semantic Categories

One e-commerce use of semantic categories is labeling the names of products using recognizer plug-ins and offering users the opportunity to buy those products from a particular e-commerce company via an action plug-in. For example, it would be useful to a CD retailer to recognize the names of albums and offer to sell those albums to users.

Another use of semantic categories is as a mechanism to identify customers who visit a web site. Due to security concerns, some users turn off cookies. As a result, it can be difficult to track the identity of users who visit web sites. Subject to privacy concerns, users who navigate to a particular web site via semantic category actions (even with cookies turned off) may have their identity transmitted to the web site by the action plug-in that allowed for navigation to that website.

Still another use of semantic categories is for electronic commerce coupon programs. There are a number of ways electronic coupons can be issued with semantic categories. In conjunction with identifying the customer as described above, discounts and promotional offers can be made based on the identity of the shopper. Electronic coupons can also be embedded in the semantic category by the recognizer plug-in. For example, when recognizing the album title "What's the story morning glory", a recognizer plug-in could embed an electronic coupon for that album in the semantic category. Viewing the HTML source of the document containing this album name might reveal something like this:

```
<st1:album discount="10%"
    couponID="123456789">What's the Story
    Morning Glory</st:album>
```

The st1:album designates "What's the Story Morning Glory" as an album. The attribute value pair discount="10%" specifies that the 'coupon' is good for 10% off. CouponID="123456789" identifies the coupon and could be drawn from a very sparse space of coupon numbers so that users couldn't easily forge their own coupons, just as it is difficult to forge credit card numbers because few of the possible numbers are valid. The action plug-in may offer the user the option to "Buy this album". When the user executes that action, the user's web browser would be taken to the coupon issuer's web site to purchase the album and the discount and couponID attribute/value pairs would be passed to the web site. The web site would interpret these attribute/value pairs and apply the discount after checking the validity of the coupon. It could also log the use of the coupon so that it could only be used once. There are a number of other attribute/value pairs that the recognizer plug-in could specify which in turn could be interpreted by the seller's web site, such as a begin and end date for the coupon, special terms of the coupon (credit card orders only, only valid when purchasing more than $50 worth of goods).

Another use of semantic categories is for electronic coupons that depend on user behavior. For example, retailers can incorporate into action plug-ins and recognizer plug-ins code that tracks user behavior and issues coupons based on that behavior. For example, users who frequently mention names of products in their documents might be deemed by a seller as being a "recommender" of their products and could as a result be offered special incentives. This may work as follows: a seller's recognizer plug-in could track the number of different products that it recognized on the user's machine and offer discounts as a result of frequent labeling. Alternatively, a seller's action plug-in could track the number of times a user navigated to the seller's web site using an action and reward them for frequently visiting. One of the advantages of these approaches is that it's completely client-side and tracks different user behavior than is possible by simply collecting statistics about web site visitation.

Another use of semantic categories is for electronic coupons that depend on buying behavior. More than simply tracking web site usage locally, retailers can track purchases locally as well and offer incentives to infrequent or lapsed buyers if they choose. For example, an e-commerce company may build into their action DLL a tracking component so that the e-commerce company does not have to expend server side processing to determine whether a customer has made a recent purchase. Using the action DLL, if an action has not been used to make a purchase for a predetermined period of time, such as 30 days, then a new action may be added to the menu to induce the buyer to make a purchase. For example, a buy one get one free action may be added if a user has not made a purchase recently.

Still another use of semantic categories is for buyer reward programs. A number of companies have affiliate or buyer reward programs in which people who recommend products to friends and acquaintances either by mentioning them on their web site or in e-mail are rewarded for their recommendation. Use of such programs requires effort on the recommender's part because it typically involves inserting hyperlinks manually into documents and mail messages. With semantic categories, recognizer plug-ins can automatically embed affiliate number identification when a product is labeled and the action plug-in can convey that information to the seller's web site. For example, if a user recommends an album to a friend, the underlying HTML might look like this:

<st1:album affiliateId="123456789">What's the Story Morning Glory</st1:album>

When the user's friend received the document or message containing the recommendation, he may use an action plug-in to make the purchase. The action would convey the affiliateID to the web site and the web site would give the user "credit" for making this recommendation.

There are more sophisticated ways to use recommendation information as well. Typically recommenders are rewarded based solely on the number of sales that result from their recommendations, but recognizer plug-ins could be instrumented in order to provide sellers with statistics about how many recommendations their affiliates make. In some cases it might be beneficial to reward people based on metrics other than the total number of sales, such as their conversion rate, the number of recommendations they make, the variety of recommendations they make, etc. For example, the recognizer DLL tracks how many times it labels something as a certain type label, e.g. compact disk. The recognizer DLL also tracks which uniques IDs were applied. When the recognizer DLL boots up each day, it converses with the e-commerce company's web server to obtain sales information for each of the unique IDs. The recognizer DLL may then use an analysis of this sales information to provide incentives, such as: providing discounts to people who convert ten percent or more of their recommendations into sales, providing discounts to people with a high number of purchases per recommendation (these are efficient recommenders and are most likely those who write things that are published), providing discounts to those recommenders with the most total recommendations, etc.

Semantic categories may also be used to simplify the process of buying multiple items from an e-commerce site that can be particularly tedious because it usually involves repeated searching. Action plug-ins may be given access to the contents of the document and can in some applications easily identify other semantic categories besides the one with which they are associated. As a result, "buy all" actions are possible. For example, a user may send e-mail to a friend saying that he'd recently purchased three compact discs and listing each of them in the e-mail. The friend may choose to purchase them all based on the user's recommendation. Action plug-ins make these purchases simple by providing an action to buy all items of a particular type mentioned in a document.

Semantic categories may also be used to implement coupon and recommendation e-mail/web pages. Many e-commerce companies distribute electronic coupons and recommendations, such as new or featured product announcements, via e-mail. Typically these e-mail messages include hyperlinks that allow users to purchase goods. Semantic category type labels (whether manually or automatically applied) and actions can be used instead of hyperlinks and convey many advantages such as: multiple actions for a single piece of data, they can be dynamic, etc. For example, a CD retailer might send an e-mail message about a featured band and the band name could be tagged with a type label in the e-mail message. Rather than simply linking the band name to the band's discography with a hyperlink, the retailer could deploy a set of actions that allow the user to look up the discography, find related bands, purchase their entire catalog of CDs, retrieve information about upcoming concerts, etc.

Semantic categories may also be used to label words and phrases associated with products and provide navigation to a retailer's website. In addition to product names themselves, there are a number of other sorts of information that may be pertinent to selling goods. So, names of manufacturers, names of authors, names of bands, and names of categories of merchandise can all be labeled by recognizer plug-ins. Once labeled as semantic categories, they can be used by action plug-ins to provide users with e-commerce opportunities. For example, a recognizer plug-in might label variants of the word "computer" and offer to take users to a computer retailer's website.

In another embodiment, semantic categories may be used to label words associated with shopping in a user's documents and provide actions to navigate to shopping web sites. Thus, in addition to labeling product names and other data particular to different types of products, commerce-related words could also be labeled. For example, it might be beneficial to label words like "buy" and "sell" and offer actions to take a user to a retailer's general purpose shopping websites.

In yet another embodiment, semantic categories may be used to mine a user's recognition results to determine the user's preferences. Many electronic commerce companies currently use techniques such as collaborative filtering to determine user preferences and make recommendations about future purchases. For example, a CD retailer could collect data about a customer's purchasing habits and compare that data to purchasing data aggregated across multiple customers to recommend music that other people with statistically similar tastes (based solely on purchasing habits from that retailer) also purchased. A problem with this approach is that it erroneously makes a closed-world—namely that the customer has bought all of their music from the retailer and as a result their purchase list represents their taste in music. However, this is rarely the case. Many users buy from multiple sources, including physical stores. A recognizer plug-in on the user's machine could, however, track the names of all bands the user typed or read about in order to get a richer portrait of the customer's preferences. In addition, that recognizer plug-in could scrutinize the customer's media player play list as an additional source of data. Similar examples apply to other categories of purchase such as: books, electronics, clothes, etc.

Semantic categories may be used to implement recommendation systems based on multiple sorts of data on user's machine. In addition to being able to build simple recommendation systems that perform collaborative filtering over single types of goods (e.g. books or CDs), semantic categories present the opportunity for retailers who sell broad varieties of goods to develop client-side profiles that represent the user's interests in a wide variety of products. This information can be intermittently transmitted to the seller in order to expand its database of customer profiles and in order to improve the collaborative filtering process.

Semantic categories may also be used to implement recommendation systems based on information other than product names and purchasing history. Shopping software on the client machine can access information about the software and computer the user possesses and could make recommendations based on that information as well. For example, knowing that the user had an ink jet printer of a particular make and model may allow a seller of printer supplies to offer useful discounts on toner cartridges or photo-quality ink jet printer paper.

In other embodiments, semantic categories may be used to implement client-side shopping application software. Current e-commerce initiatives revolve around directing users to websites. Although this approach works fairly well, it has the limitation of using HTML (or an animation package such as Flash or Director) to provide the user interface. With semantic categories, it's possible to build actions that allow users to shop and buy using the full richness of the operating system desktop user interface standards. Semantic categories provide a natural entry point for such a shopping application in applications, e-mail messages and on the Web.

Semantic categories may be used to implement client-side shopping applications designed to minimize server load. Numerous companies have built comparison shopping services (e.g. MySimon.com). There are a number of technical difficulties in building and maintaining these services including: 1) many shopping sites block spider and robot programs from harvesting information from the sites and, as a result, block comparison shopping services from retrieving the data they need; and 2) there is a large demand on server software due to the need to remain up-to-date in a marketplace with ever-changing prices because of the need to query shopping sites frequently to avoid making recommendations with out-of-date information. Building a client-side shopping application using semantic categories has the advantage that the shopping application is run on the client's machine and that machine bears the brunt of the burden for communicating with other web sites. Thus, the model is changed from one of caching prices on the server and delivering information about the best deals to the user when they browse the comparison shopping service's web site to having the client-side shopping application poll a number of web sites when the user makes a purchase or price request. This use of semantic categories essentially moves the comparison service from a client-server paradigm to a peer-to-peer paradigm. The client application could host advertising or the user could pay a monthly fee or a transaction fee for use of the client-side comparison pricing service.

In still another embodiment, semantic categories may be used to store product identity information. There are often numerous similarly named products, including different editions of books, products that differ only in terms of model year, etc. However, often times there is a product identification code that distinguishes among them. For example, books have ISBN numbers that distinguish between paperback and hardback versions. It may be useful for applications to store product information in the semantic category when a string is labeled as such to facilitate e-commerce. In some cases, this labeling may be trivial if there is one version of a particular product. However, in other cases there may be many versions of a particular product. In these cases, computation may be performed on the user's machine based on attributes such as the language of the text, the location of the user's machine, the current date, information about the user's buying preferences, etc. For example, the book "Harry Potter and the Goblet of Fire" was released simultaneously in the U.S., the U.K. and elsewhere. U.S. users typically want to purchase U.S. editions of books so the semantic category might contain the ISBN for the U.S. edition. However, determining that the user is in the U.S. requires that the recognizer plug-in evaluate various information on the user's machine, possibly including the version of the "OFFICE" suite (or other software) installed. This evaluation may include determining the locale of the user's machine, checking the locale as set in the operating system, checking the current time zone, checking the language used by the user interface, checking the user's profile with the bookseller, etc.

Semantic categories may also be used to attach unique identities to instances of product names. As a retailer, it might be useful to know which instances of particular mentions of products are used to initiate sales of those products. This identification goes one step further than affiliate programs, which have the identity of the recommender as the most granular level of detail. This identification may work as follows: every time a recognizer plug-in labels a particular string with a particular type label, the recognizer plug-in may insert an attribute/value pair into the semantic category as metadata. This attribute/value pair is essentially a globally unique identifier (GUID)—a 128 bit number that uniquely identifies this recognition event. Actions initiated from the labeled semantic category may be built in such a way that the GUID is passed to the web site involved in the e-commerce transaction when the action is requested. This allows the retailer to track which instances of a recommendation are most successful, as well as how many recommendations (or, more specifically, mentions) of a particular product are made by a particular customer. It also allows purchasing behavior and network effects to be tracked. For example, user A might recommend a book (with GUID x) to a user B in an e-mail message. User B might forward the recommendation (or copy and paste, which would preserve the GUID) to two friends, who in turn might forward it to two friends each and so on. Current affiliate programs typically give the credit for the recommendation to the person who made the most recent recommendation and have no mechanism for tracking this sort of network effect, because each recommendation is identical. Placing GUIDs in semantic categories would allow these sorts of effects to be studied and rewarded so that particular individuals could be targeted with promotional information, coupons or other devices that encourage them to purchase and subsequently recommend what they purchase.

In yet another embodiment, semantic categories may be used to retrieve document contents during a transaction initiated from an action. Action plug-ins have the opportunity to gather information about the document from which the action was initiated. This data can then be used in whatever programmatic way the author of the action plug-in chooses. In some cases, subject to privacy constraints, it might be useful to transmit this information to the author of the action plug-in. This information may enable the retailer to examine data about recommendations in order to determine whether certain forms of recommendations are more powerful or generate additional sales. This information could be used to alter the wording of the retailer's promotional offers, coupons and web site content.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for providing electronic commerce actions in an electronic system for creating and editing an electronic document, the method comprising:
   automatically receiving, in a plurality of recognizer plug-ins, a string of text of the electronic document after the entire string of text has been entered in the electronic document;
   in each of the plurality of recognizer plug-ins, recognizing at least a portion of the string of text by annotating the string of text to determine a type label when the string includes any of a plurality of predetermined strings;
   associating each label with the string of text, wherein each recognized string of text, its associated type label, and a download Uniform Resource Locator (URL) address form a semantic category, the URL address being for downloading actions associated with the semantic category, and wherein the type labels are stored along with the electronic document; and
   providing a list of actions that may be performed to purchase a product associated with the string of text based on the semantic category of the string of text, wherein the list of actions is dynamically generated based on the semantic category of the string of text for each type label of the semantic category and provided in response to a user selecting a dropdown menu associated with each type label.

2. The method of claim 1 wherein the plurality of predetermined strings comprises a plurality of product names.

3. The method of claim 1 further comprising:
   receiving an input indicating that one of the list of actions has been selected; and
   in response, connecting a web browser associated with the electronic system to a web site associated with the selected action.

4. The method of claim 3 wherein an identifier of the user of the system is stored in association with each type label and wherein the method further comprises:
   transmitting to the web site the identifier of the user of the system.

5. The method of claim 4 wherein in response to identifying the user providing a discount offer to the user.

6. The method of claim 3 wherein an identifier of the user of the system is stored in association with the actions and wherein the method further comprises:
   transmitting to the web site the identifier of the user of the system.

7. The method of claim 1 further comprising providing a coupon for the product in the each type label.

8. The method of claim 7 wherein the coupon comprises a coupon identification.

9. The method of claim 7 wherein the coupon comprises a coupon identification and a discount value and further comprising the step of sending the coupon to the web site.

10. The method of claim 9 wherein the coupon further comprises a begin date and an end date.

11. A method for providing an electronic coupon to a user of an electronic document, the method comprising:
   using each of a plurality of recognizer modules to determine a number of strings in a database that match at least one string in the electronic document;
   recognizing the matched strings by labeling the matched strings in the electronic document associated with each of the plurality of recognizer modules, wherein the label is stored along with the electronic document, and wherein the recognized string, the associated label, and a download Uniform Resource Locator (URL) address are part of a semantic category associated with the recognized string, the URL address being for downloading actions associated with the semantic category;
   providing a plurality of actions in association with the recognized strings based on the associated semantic category;
   determining whether the number of recognized strings exceeds a predetermined minimum;
   if so, then providing a coupon associated with a web site as one of the plurality of actions; and
   passing an identifier associated with the semantic category of a selected action to the web site associated with the coupon such that instances of the provided action are tracked.

12. The method of claim 11 wherein the strings in the database comprise names of consumer products.

13. A method for purchasing a plurality of items from an e-commerce retailer comprising:
   identifying the plurality of items in an electronic document by a plurality of recognizer modules on a user's computer, wherein each of the plurality recognizer modules receives the plurality of items, recognizes the plurality of items by annotating the plurality of items to determine a label, and associates each label with the plurality of items each recognized, item its associated label, and a URL of the e-commerce retailer forming a semantic category, wherein the plurality of items are identified as matching at least one term in a product database, and wherein the plurality of items are already entered in the electronic document prior to being identified;
   providing, in association with at least one of the identified plurality of items based on the associated label and its semantic category, an action to buy all of the identified plurality of items, wherein the action is associated with a dynamically generated list of actions based on the semantic categories;
   receiving an indication that the action has been selected;

sending a list of the identified plurality of items to a web site associated with the e-commerce retailer the URL of the web site also being part of the semantic category of the recognized item associated with the selected action; and sending an indication to buy all of the identified plurality of items to a web site associated with the e-commerce retailer.

14. The method of claim 13 wherein the product database is stored on the user's computer and wherein the product database comprises a list of product titles and product names found on the web site associated with the e-commerce retailer.

15. A computer-implemented method for using a recommendation e-mail from an e-commerce retailer to a computer, comprising:

receiving an e-mail from the retailer, wherein the e-mail comprises a product name of a product for sale by the retailer;

cross-referencing the product name with a type label database to determine whether the product name matches at least one entry in the type label database, wherein cross-referencing the product name with a type label database to determine whether the product name matches at least one entry in the type label database is performed by a plurality of recognizer modules on the computer;

if so, then labeling the product name with a type label associated with each of the plurality of recognizer modules, wherein the product name, its associated type label, and a URL of a web site associated with the product name are part of a semantic category, and wherein the type label is stored along with one of the e-mail and an associated document;

cross-referencing each type label with a plurality of actions to determine which actions match each type label based on the associated semantic category;

listing the matching actions in association with the product name to provide a user of the computer with a number of different actions, wherein the list is dynamically generated based on the associated semantic category by examining a registry to determine installed actions.

16. The method of claim 15 wherein cross-referencing each type label with a plurality of actions to determine which actions match each type label and listing the matching actions in association with the product name to provide a user of the computer with a number of different actions are performed by an action module on the computer.

17. The method of claim 15, further comprising determining a locale of the user based on information associated with the user's computer to determine which one of a plurality of versions of a product associated with the product name to provide for purchase by the user.

18. The method of claim 15, further comprising forwarding information associated with the user to an author of an action plug-in installed in the user's computer for providing the actions associated with selected product names.

* * * * *

UNITED STATES PATENT AND TRADEMARK OFFICE
CERTIFICATE OF CORRECTION

| | | |
|---|---|---|
| PATENT NO. | : 7,421,645 B2 | Page 1 of 1 |
| APPLICATION NO. | : 09/841266 | |
| DATED | : September 2, 2008 | |
| INVENTOR(S) | : Reynar | |

It is certified that error appears in the above-identified patent and that said Letters Patent is hereby corrected as shown below:

In column 15, line 19, after "closed-world" insert -- assumption --.

Signed and Sealed this
Third Day of May, 2011

David J. Kappos
*Director of the United States Patent and Trademark Office*